(12) United States Patent
Okamura (10) Patent No.: US 9,921,624 B1
(45) Date of Patent: Mar. 20, 2018

(54) APPARATUS, SYSTEM, AND METHOD FOR TEMPERATURE-BASED REGULATION OF ELECTRICAL POWER OUTPUT

(71) Applicant: Juniper Networks, Inc., Sunnyvale, CA (US)

(72) Inventor: Katsuhiro Okamura, Watsonville, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 62 days.

(21) Appl. No.: 14/736,175

(22) Filed: Jun. 10, 2015

(51) Int. Cl.
  G06F 1/00 (2006.01)
  G06F 1/20 (2006.01)
  G06F 1/26 (2006.01)

(52) U.S. Cl.
  CPC .............. G06F 1/206 (2013.01); G06F 1/26 (2013.01)

(58) Field of Classification Search
  CPC ................................... G06F 1/206; G06F 1/26
  USPC ........................................................ 713/300
  See application file for complete search history.

(56) References Cited

U.S. PATENT DOCUMENTS

| | | | | |
|---|---|---|---|---|
| 2006/0259800 A1* | 11/2006 | Maejima | ............... | G06F 1/3203 713/300 |
| 2009/0204839 A1* | 8/2009 | Gross | .................... | G06F 1/206 713/340 |
| 2011/0314318 A1* | 12/2011 | Sawai | ................... | H05K 7/1498 713/340 |
| 2012/0310439 A1* | 12/2012 | Lin | .................... | G05D 23/1934 700/300 |
| 2013/0166087 A1* | 6/2013 | Yamanaka | ............... | G06F 1/26 700/295 |
| 2015/0113310 A1* | 4/2015 | Mistry | .................. | H02H 3/006 713/340 |
| 2015/0277517 A1* | 10/2015 | Zhang | ..................... | G06F 1/189 361/622 |
| 2015/0346789 A1* | 12/2015 | Chen | ....................... | G06F 1/263 713/300 |
| 2016/0079741 A1* | 3/2016 | Englert | ............... | H05K 7/1492 361/624 |
| 2016/0282928 A1* | 9/2016 | Shabbir | ................... | G06F 1/206 |

OTHER PUBLICATIONS

Mammano, Bob et al., "Load Sharing with Paralleled Power Supplies", Topic 2, Unitrode Corporation, Texas Instruments Incorporated, (Sep. 1991).

* cited by examiner

*Primary Examiner* — Robert Cassity
(74) *Attorney, Agent, or Firm* — FisherBroyles, LLP (57) ABSTRACT

The disclosed apparatus may include (1) at least one power interface that unites a plurality of power supplies that output electrical power for consumption by a network device that facilitates network traffic within a network and (2) a power-management unit communicatively coupled to the plurality of power supplies, wherein the power-management unit (A) detects an operating temperature of a power supply within the plurality of power supplies that output electrical power for consumption by the network device, (B) determines that the operating temperature of the power supply exceeds a temperature threshold, and then (C) modifies an amount of electrical power being output by the power supply to account for the operating temperature exceeding the temperature threshold. Various other apparatuses, systems, and methods are also disclosed.

17 Claims, 5 Drawing Sheets

APPARATUS, SYSTEM, AND METHOD FOR TEMPERATURE-BASED REGULATION OF ELECTRICAL POWER OUTPUT

BACKGROUND

Some network devices (such as routers) may include and/or rely on a multitude of power supplies to facilitate operation. For example, a network device may draw electrical power from 24 different power supplies. In this example, the 24 power supplies may be set up in a traditional daisy-chain configuration to distribute electrical power to various components of the network device by way of a power-sharing bus. As a result of this traditional daisy-chain configuration, the power supply that is outputting the highest amount of current may essentially dictate and/or control the electrical power level of the power-sharing bus. In other words, the analog signal of the highest-outputting power supply may set the electrical power level of the power-sharing bus while the other power supplies included in the daisy-chain configuration attempt to match that electrical power level by increasing their current output.

Unfortunately, this type of traditional approach to power distribution within network devices may have a few weaknesses and/or inefficiencies. For example, the traditional daisy-chain configuration may fail to account for differences in operating temperature among the power supplies. High operating temperatures may decrease the reliability of the power supplies, which is often measured in terms of Mean Time Between Failures (MTBF).

Various factors may contribute and/or lead to high operating temperatures among the power supplies, including the amount of electric current being output by the power supplies and/or the ambient air temperature surrounding the power supplies. Network devices may also include cooling mechanisms (such as fan trays) designed to reduce the ambient air temperature surrounding the power supplies and thus increase the reliability (or MTBF) of the power supplies. However, the power supplies may be located and/or positioned in different areas of the network device. Unfortunately, the cooling mechanisms may be more effective at reducing the ambient air temperature in some areas of the network device than others.

As a specific example, the network device may include a top compartment that houses 12 power supplies and a bottom compartment that houses 12 other power supplies. In this example, the network device may also include cooling fans that blow and/or deliver air to the various power supplies housed in the top compartment and the bottom compartment. Unfortunately, the air blown and/or delivered to the top compartment may pass over a higher number of line cards than the air blown and/or delivered to the bottom component due to the user's chosen configuration. The heat dissipated by this higher number of line cards may cause an increase in the temperature of the air blown and/or delivered to the top compartment. As a result, the ambient air temperature surrounding the power supplies housed in the top compartment may be higher than the ambient air temperature surrounding the power supplies housed in the bottom compartment, thereby potentially increasing the operating temperature and/or decreasing the reliability (or MTBF) of the power supplies housed in the top compartment.

The instant disclosure, therefore, identifies and addresses a need for additional and improved apparatuses, systems, and methods for temperature-based regulation of electrical power output by power supplies of network devices.

SUMMARY

As will be described in greater detail below, the instant disclosure generally relates to apparatuses, systems, and methods for temperature-based regulation of electrical power output. In one example, an apparatus for accomplishing such a task may include (1) at least one power interface that unites a plurality of power supplies that output electrical power for consumption by a network device that facilitates network traffic within a network and (2) a power-management unit communicatively coupled to the plurality of power supplies, wherein the power-management unit (A) detects an operating temperature of a power supply within the plurality of power supplies that output electrical power for consumption by the network device, (B) determines that the operating temperature of the power supply exceeds a temperature threshold, and then (C) modifies an amount of electrical power being output by the power supply to account for the operating temperature exceeding the temperature threshold.

Similarly, a network device incorporating the above-described apparatus may include (1) a plurality of power supplies that output electrical power for consumption in facilitating network traffic within a network and (2) a power-management unit communicatively coupled to the plurality of power supplies, wherein the power-management unit (A) detects an operating temperature of a power supply within the plurality of power supplies that output electrical power for consumption in facilitating network traffic within the network, (B) determines that the operating temperature of the power supply exceeds a temperature threshold, and then (C) modifies an amount of electrical power being output by the power supply to account for the operating temperature exceeding the temperature threshold.

A corresponding method may include (1) identifying a plurality of power supplies that output electrical power for consumption by a network device that facilitates network traffic within a network, (2) detecting an operating temperature of a power supply within the plurality of power supplies that output electrical power for consumption by the network device, (3) determining that the operating temperature of the power supply exceeds a temperature threshold, and then (4) modifying an amount of electrical power being output by the power supply to account for the operating temperature exceeding the temperature threshold.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for temperature-based regulation of electrical power output. As will be explained in greater detail below, embodiments of the instant disclosure may facilitate control over the amount of electrical power output by individual power supplies included in a network device. These embodiments may take into account the varying operating temperatures of the individual power supplies and determine, based at least in part on the varying operating temperatures, whether to increase or decrease the amount of electrical power output by the individual power supplies. By increasing or decreasing the amount of electrical power output by the individual power supplies in this way, these embodiments may ensure that the individual power supplies are each operating at an acceptable temperature and/or an acceptable level of reliability, thereby increasing or maintaining the MTBF of the power supplies.

Figure 1:
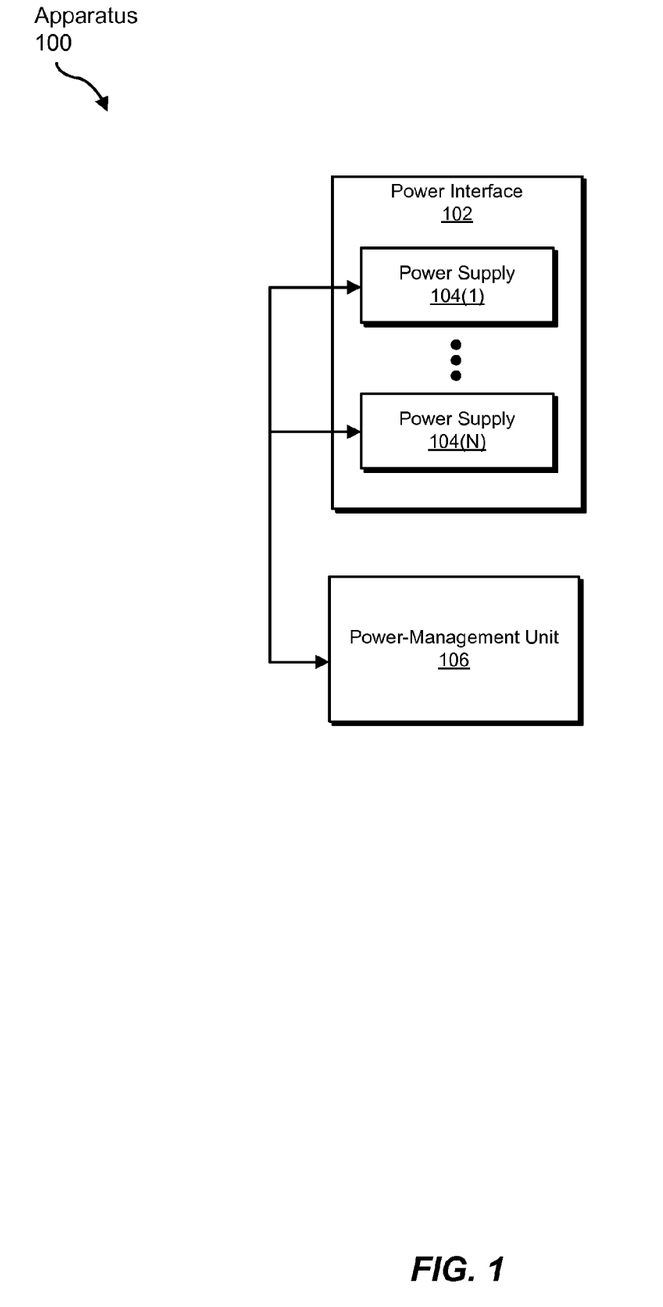
FIG. 1 is a block diagram of an exemplary apparatus for temperature-based regulation of electrical power output.

The following will provide, with reference to FIG. 1, examples of apparatuses that facilitate temperature-based regulation of electrical power output. The discussions corresponding to FIGS. 2 and 3 will provide detailed descriptions of exemplary implementations of apparatuses that facilitate temperature-based regulation of electrical power output. The discussion corresponding to FIG. 4 will provide a detailed description of an exemplary method for temperature-based regulation of electrical power output. Finally, the discussion corresponding to FIG. 5 will provide numerous examples of systems that may incorporate the apparatus from FIG. 1.

FIG. 1 shows a block diagram of an exemplary apparatus 100 for temperature-based regulation of electrical power output. Apparatus 100 generally represents any type or form of system, device, and/or mechanism that facilitates temperature-based regulation of electrical power output. Examples of apparatus 100 include network devices, routers, switches, hubs, modems, bridges, repeaters, gateways, multiplexers, network adapters, network racks, chasses, portions of one or more of the same, variations of one or more of the same, combinations of one or more of the same, or any other suitable apparatus.

As shown in FIG. 1, apparatus 100 may include a power-management unit 106 communicatively coupled to power supplies 104(1)-(N). The term "power-management unit," as used herein, generally refers to any type or form of physical hardware, circuit, device, and/or processor that performs certain Input/Output (I/O) operations and/or computing tasks directed to temperature-based regulation of electrical power output. In one example, power-management unit 106 may represent an integrated circuit whose configuration and/or infrastructure is at least partially fixed. Additionally or alternatively, power-management unit 106 may represent an integrated circuit whose configuration and/or infrastructure is at least partially variable and/or programmable. Examples of power-management unit 106 include, without limitation, processors, microprocessors, microcontrollers, Central Processing Units (CPUs), Field-Programmable Gate Arrays (FPGAs), Application-Specific Integrated Circuits (ASICs), software modules running on one or more of the same, portions of one or more of the same, variations of one or more of the same, combinations of one or more of the same, or any other suitable processing unit.

The term "power supply," as used herein, generally refers to any type or form of physical device and/or mechanism that facilitates the intake, output, conversion, and/or flow of electric current and/or power. In some examples, power supplies 104(1)-(N) may output electrical power for consumption by a network device that facilitates network traffic within a network. Examples of power supplies 104(1)-(N) include, without limitation, Alternating Current (AC) power supplies, Direct Current (DC) power supplies, redundant power supplies, load-sharing power supplies, variations of one or more of the same, combinations of one or more of the same, or any other suitable power supplies.

In one example, power supplies 104(1)-(N) may be modularly removable and/or at least partially redundant with respect to one another. Additionally or alternatively, power supplies 104(1)-(N) may share an electrical load. For example, power supplies 104(1)-(N) may provide, distribute, and/or otherwise output electrical power shared and/or consumed by various electrical components within a network device. Examples of such electrical components include, without limitation, line cards, Physical Interface Cards (PICs), Flexible PIC Concentrators (FPCs), Switch Interface Boards (SIBs), control boards, routing engines, communication ports, fan trays, Field-Replaceable Units (FRUs), backplanes, connector interface panels, variations of one or more of the same, combinations of one or more of the same, or any other suitable components.

In one example, each of power supplies 104(1)-(N) may include and/or have access to a power input. The term "power input," as used herein, generally refers to any type or form of physical input, inlet, connector, cable, and/or coupler that facilitates the flow and/or intake of electric current and/or power. In one example, each of power supplies 104(1)-(N) may draw electric current (whether AC or DC) from and/or by way of a power input. Examples of such power inputs include, without limitation, AC power inputs, DC power inputs, IEC C19/C20 couplers, IEC C13/C14 couplers, twist-lock couplers, IEC C1/C2 couplers, IEC C3/C4 couplers, IEC C5/C6 couplers, IEC C7/C8 couplers, IEC C9/C10 couplers, IEC C11/C12 couplers, IEC C15/C16 couplers, IEC C15A/C16A couplers, IEC C17/C18 couplers, IEC C21/C22 couplers, IEC C23/C24 couplers, variations of one or more of the same, combinations of one or more of the same, or any other suitable power inputs.

As shown in FIG. 1, apparatus 100 may also include at least one power interface 102 that unites one or more of power supplies 104(1)-(N) together physically and/or electrically. The term "power interface," as used herein, generally refers to any type or form of physical hardware that houses, holds, and/or otherwise joins power supplies within a network device. In one example, power interface 102 may include and/or represent a Power Supply Module (PSM). This PSM may include various slots each designed to house and/or hold one of power supplies 104(1)-(N).

In one example, power interface 102 may convert electric current collected and/or received via one or more of power supplies 104(1)-(N) from one form to another. Additionally or alternatively, power interface 102 may regulate a voltage and/or power level outputted to the network device based at least in part on the amount of electric current collected or received from power supplies 104(1)-(N).

In one example, power-management unit 106 may be communicatively coupled to each of power supplies 104(1)-(N) by way of a serial communication bus. In this example, power-management unit 106 may detect an operating temperature of at least one power supply within power supplies 104(1)-(N). Power-management unit 106 may determine that the operating temperature of that power supply exceeds a temperature threshold. Power-management unit 106 may then modify the amount of electrical power being output by that power supply to account for the operating temperature exceeding the temperature threshold.

Figure 2:
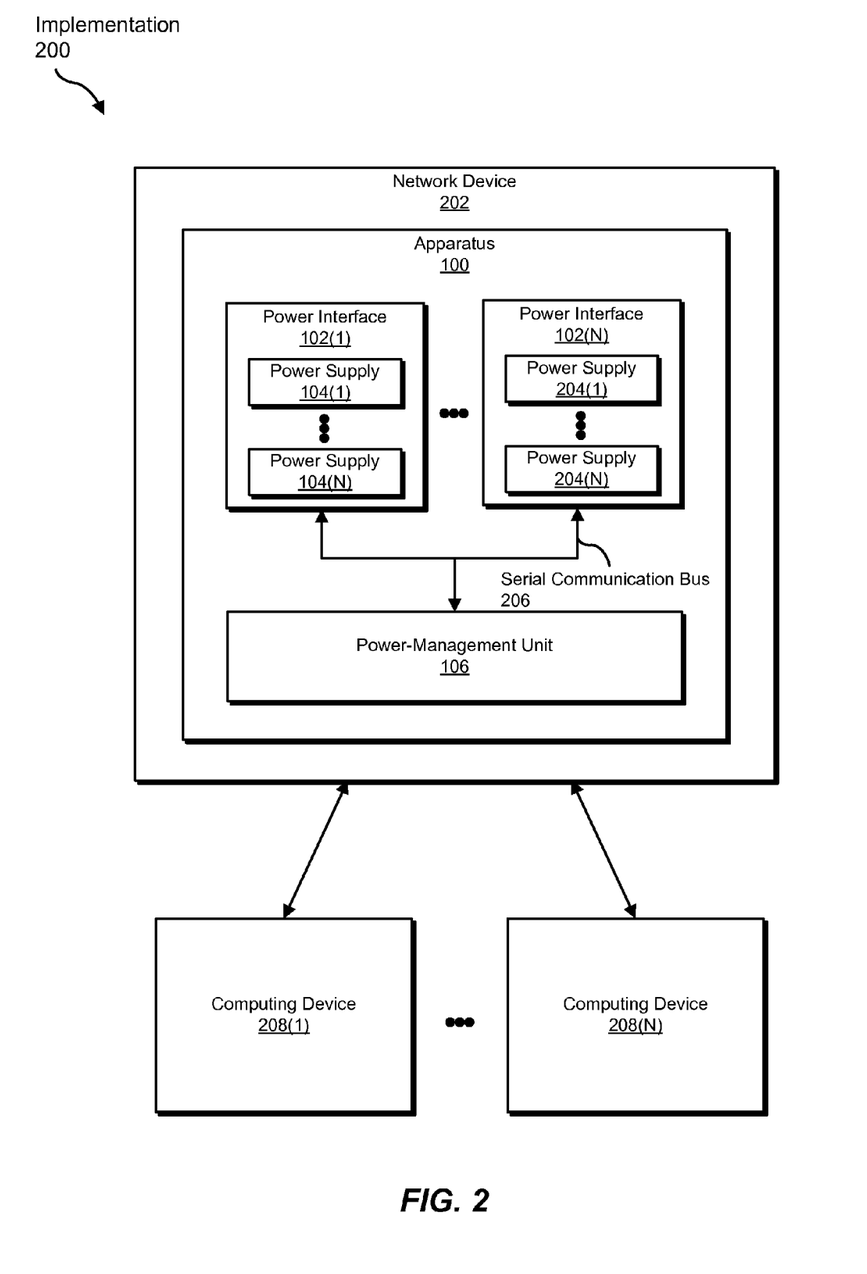
FIG. 2 is a block diagram of an exemplary implementation of an apparatus for temperature-based regulation of electrical power output.
}

FIG. 2 shows a block diagram of an exemplary implementation 200 of apparatus 100 for temperature-based regulation of electrical power output. As illustrated in FIG. 2, implementation 200 may include apparatus 100 as a portion and/or component of a network device 202 that facilitates network traffic within a network. The term "network," as used herein, generally refers to any type or form of medium and/or architecture that facilitates communication or data transfer. In one example, the network (although not explicitly delineated or illustrated in FIG. 2) may include network device 202 and one or more computing devices 208(1)-(N). In this example, network device 202 may facilitate communication and/or network traffic exchanged among computing devices 208(1)-(N).

Examples of such a network include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations of one or more of the same, combinations of one or more of the same, or any other suitable network. This network may facilitate communication or data transfer using wireless and/or wired connections.

The term "network device," as used herein, generally refers to any type or form of system, device, and/or mechanism that facilitates communication and/or network traffic among computing devices. Examples of network device 202 include, without limitation, routers, switches, hubs, modems, bridges, repeaters, gateways, multiplexers, network adapters, network racks, chasses, portions of one or more of the same, variations of one or more of the same, combinations of one or more of the same, or any other suitable network device.

In some examples, network device 202 may include a plurality of power interfaces 102(1)-(N). In one example, power interface 102(1) may house and/or unite power supplies 104(1)-(N). In this example, power interface 102(N) may house and/or unite power supplies 204(1)-(N). Examples of power supplies 204(1)-(N) include, without limitation, AC power supplies, DC power supplies, redundant power supplies, load-sharing power supplies, variations of one or more of the same, combinations of one or more of the same, or any other suitable power supplies.

In some examples, power interface 102(1) may group together power supplies 104(1)-(N) at a first area with respect to network device 202. For example, power interface 102(1) may represent and/or be located in a top compartment of network device 202. In other words, power interface 102(1) may house and/or unite power supplies 104(1)-(N) in a top compartment of network device 202.

In such examples, power interface 102(N) may group together power supplies 204(1)-(N) at a second area with respect to network device 202. For example, power interface 102(N) may represent and/or be located in a bottom compartment of network device 202. In other words, power interface 102(N) may house and/or unite power supplies 204(1)-(N) in a bottom compartment of network device 202. Accordingly, when network device 202 is arranged in a vertical configuration, the top compartment may hold power supplies 104(1)-(N) united by power interface 102(1) physically above the bottom compartment that holds power supplies 204(1)-(N) united by power interface 102(N). Likewise, the bottom compartment may hold power supplies 204(1)-(N) united by power interface 102(N) physically below the top compartment that holds power supplies 104(1)-(N) united by power interface 102(1).

In one example, power supplies 104(1)-(N) and 204(1)-(N) may each be modular such that a user and/or an administrator of network device 202 is able to determine how many power supplies to mount and/or install into the top and/or bottom compartments. Similarly, various electrical components (such as line cards and/or FPCs) may each be modular such that the user and/or administrator of network device 202 is able to determine how many of those electrical components to mount and/or install in network device 202. In this example, the electrical components may occupy and/or sit in certain channels and/or airways that deliver air from a cooling mechanism to the top and/or bottom compartments. As a result, the heat dissipated by those electrical components may cause an increase in the temperature of the air blown and/or delivered to the top and/or bottom compartments.

Accordingly, as the number of electrical components mounted and/or installed in the top compartment increases so too may the temperature of the air blown and/or delivered to the top compartment. Unfortunately, high operating temperatures in the top compartment may decrease the reliability and/or the MTBF of the power supplies located in the top compartment.

Similarly, as the number of electrical components mounted and/or installed in the bottom compartment increases so too may the temperature of the air blown and/or delivered to the bottom compartment. Moreover, high operating temperatures in the bottom compartment may decrease the reliability and/or the MTBF of the power supplies located in the bottom compartment.

Since, in this example, the user and/or administrator of network device 202 has a certain level of control over the number of power supplies and/or electrical components (such as line cards and/or FPCs) mounted and/or installed in each of the top and bottom compartments, the vendor and/or manufacturer of network device 202 may be unable to accurately predict and/or anticipate the exact configuration of power supplies and/or electrical components within network device 202 at any given time. To increase the reliability and/or MTBF of the power supplies and/or operate the power supplies in their most efficient temperature or output range regardless of the configuration selected by the user and/or administrator, power-management unit 106 may take into account the varying operating temperatures of the individual power supplies.

In addition, power-management unit 106 may determine, based at least in part on the operating temperatures, whether to increase or decrease the amount of electric current and/or electrical power output by the individual power supplies. By increasing or decreasing the amount of electric current and/or electrical power output by the individual power supplies in this way, power-management unit 106 may ensure that the individual power supplies are each operating at an acceptable temperature and/or an acceptable level of reliability, thereby increasing or maintaining the MTBF of the power supplies.

In some examples, power-management unit 106 may detect the operating temperature of each of power supplies 104(1)-(N) and/or 204(1)-(N). For example, power-management unit 106 may query each of power supplies 104(1)-(N) and/or 204(1)-(N) for their operating temperatures via a serial communication bus 206 in FIG. 2. In this example, power-management unit 106 may also query each of power supplies 104(1)-(N) and/or 204(1)-(N) for their input voltages and currents, output voltages and currents, and/or hours of operation via serial communication bus 206 in FIG. 2. Examples of serial communication bus 206 include, without limitation, an Inter-Integrated Circuit (I$^2$C) bus, a Two-Wire Interface (TWI) bus, a Serial Peripheral Interface (SPI) bus, a variation of one or more of the same, a combination of one or more of the same, or any other suitable serial communication bus.

In one example, each of power supplies 104(1)-(N) and/or 204(1)-(N) may include a processor and a temperature sensor. Each processor may detect and/or monitor the operating temperature of the power supply based at least in part on a temperature reading from the temperature sensor. In this example, power-management unit 106 of apparatus 100 may serve as a master device and each processor included in power supplies 104(1)-(N) and/or 204(1)-(N) may serve as a slave device with respect to serial communication bus 206. For example, apparatus 100 may function as the master and power supplies 104(1)-(N) and/or 204(1)-(N) may function as slaves over I$^2$C.

Upon detecting the operating temperatures of power supplies 104(1)-(N) and/or 204(1)-(N), power-management unit 106 may determine that the operating temperature of at least one of power supplies 104(1)-(N) and/or 204(1)-(N) exceeds a temperature threshold. For example, power-management unit 106 may determine that the operating temperature of power supply 104(1) exceeds a temperature threshold. The term "temperature threshold," as used herein, generally refers to any type or form of temperature used as a reference point for determining whether to modify the amount of electrical power being output by a power supply. In one example, the temperature threshold may mark and/or represent the maximum (or highest) acceptable temperature at which a power supply is allowed to operate. In another example, the temperature threshold may mark and/or represent the minimum (or lowest) acceptable temperature at which a power supply is allowed to operate.

Continuing with the above example, upon determining that the operating temperature of power supply 104(1) exceeds the temperature threshold, power-management unit 106 may modify the amount of electrical power being output by power supply to account for the operating temperature exceeding the temperature threshold. For example, in the event that the temperature threshold marks the maximum acceptable temperature, power-management unit 106 may decrease the amount of electric current provided, distributed, and/or otherwise output by power supply 104(1) in an effort to bring the operating temperature of power supply 104(1) below the maximum acceptable temperature. As another example, in the event that the temperature threshold marks the minimum acceptable temperature, power-management unit 106 may increase the amount of electric current provided, distributed, and/or otherwise output by power supply 104(1) in an effort to bring the operating temperature of power supply 104(1) above the minimum acceptable temperature.

In some examples, power-management unit 106 may modify the amount of electrical power being output by power supply 104(1) by directing power supply 104(1) to output a different amount of electrical power via serial communication bus 206. For example, power-management unit 106 may send an I$^2$C message to power supply 104(1) via serial communication bus 206. In this example, the I$^2$C message may direct power supply 104(1) to provide, distribute, and/or otherwise output an amount of electrical power that is likely to bring the operating temperature of power supply 104(1) to an acceptable level with respect to the temperature threshold.

Additionally or alternatively, power-management unit 106 may modify the amount of electrical power being output by power supply 104(1) by writing a register value to a processor register of power supply 104(1) via serial communication bus 206. In this example, the register value written to the processor register of power supply 104(1) may be commensurate to the different amount of electrical power to be provided, distributed, and/or otherwise output by power supply 104(1). Power-management unit 106 may use the present amount of electric current being output by power supply 104(1) as a reference point and then adjust that amount of electric current to bring the operating temperature of power supply 104(1) to an acceptable level with respect to the temperature threshold.

In some examples, the temperature threshold may be based at least in part on the operating temperature of at least one other power supply included in power supplies 104(1)-(N) and/or 204(1)-(N). For example, power-management unit 106 may determine that the operating temperatures of power supplies 204(1)-(N) are all within a particular temperature range. In this example, power-management unit 106 may use at least part of that particular temperature range as the input value(s) for an equation that computes the temperature threshold. As a result, power-management unit 106 may determine the temperature threshold by inputting at least part of that particular temperature range into the equation that computes the temperature threshold. Power-management unit 106 may then compare the operating temperature of power supply 104(1) (or any other power supplies included in power interface 102(1)) against the temperature threshold determined from the operating temperatures of power supplies 204(1)-(N).

In some examples, the temperature threshold may be based at least in part on an MTBF metric that corresponds to the operating temperature of power supply 104(1). For example, the MTBF of power supply 104(1) may vary depending on the operating temperature of power supply 104(1). In this example, in the event that the operating temperature of power supply 104(1) is relatively high, the MTBF of power supply 104(1) may be relatively low, meaning that power supply 104(1) is fairly unreliable and/or liable to fail somewhat frequently. As a result, power-management unit 106 may establish, assign, and/or determine a temperature threshold that corresponds to an acceptable MTBF for power supply 104(1). Power-management unit 106 may then compare the operating temperature of power supply 104(1) (or any other power supplies included in power interface 102(1)) against the temperature threshold determined based at least in part on the acceptable MTBF.

As a specific example, power-management unit 106 may detect an operating temperature of 55° C. and/or 131° F. for power supply 104(1) included in power interface 102(1). In this example, power-management unit 106 may determine that the 55° C. and/or 131° F. operating temperature of power supply 104(1) exceeds a maximum temperature threshold of 54° C. and/or 129° F. In one example, this maximum temperature threshold of 54° C. and/or 129° F. may have been determined and/or derived at least in part from the operating temperature of at least one other power supply included in power supplies 104(1)-(N) and/or 204(1)-(N). Additionally or alternatively, this maximum temperature threshold of 54° C. and/or 129° F. may have been determined and/or derived at least in part from an MTBF metric that marks and/or represents an acceptable MTBF for power supply 104(1).

In response to determining that the 55° C. and/or 131° F. operating temperature of power supply 104(1) exceeds the maximum temperature threshold of 54° C. and/or 129° F., power-management unit 106 may modify the amount of electrical power being output by power supply 104(1). For example, power-management unit 106 may direct power supply 104(1) to output a lesser amount of electric current by writing, to a processor register of power supply 104(1) via serial communication bus 206, a register value that is commensurate to the lesser amount of electric current.

As another example, power-management unit 106 may detect an operating temperature of 35° C. and/or 95° F. for power supply 204(1) included in power interface 102(N). In this example, power-management unit 106 may determine that the 35° C. and/or 95° F. operating temperature of power supply 204(1) does not reach a minimum temperature threshold of 45° C. and/or 113° F. In one example, this minimum temperature threshold of 45° C. and/or 113° F. may have been determined and/or derived at least in part from the operating temperature of at least one other power supply included in power supplies 104(1)-(N) and/or 204(1)-(N). Additionally or alternatively, this minimum temperature threshold of 45° C. and/or 113° F. may have been determined and/or derived at least in part from an MTBF metric that marks and/or represents an acceptable MTBF for power supply 204(1).

In response to determining that the 35° C. and/or 95° F. operating temperature of power supply 204(1) does not reach the minimum temperature threshold of 45° C. and/or 113° F., power-management unit 106 may modify the amount of electrical power being output by power supply 204(1). For example, power-management unit 106 may direct power supply 204(1) to output a greater amount of electric current by writing, to a processor register of power supply 204(1) via serial communication bus 206, a register value that is commensurate to the greater amount of electric current.

In some examples, power-management unit 106 may be able to balance power supplies 104(1)-(N) and/or 204(1)-(N) with respect to one another based not necessarily on the amount of electric power output by the power supplies but, rather, on the operating temperatures of the power supplies. For example, power-management unit 106 may modify the amount of electric power output by one or more of power supplies 104(1)-(N) and/or 204(1)-(N) to bring the operating temperatures of all of power supplies 104(1)-(N) and 204 (1)-(N) within a certain number of degrees of one another. In other words, power-management unit 106 may ensure that all operating temperatures of power supplies 104(1)-(N) and/or 204(1)-(N) are maintained within a certain number of degrees of one another. By ensuring that all operating temperatures are maintained in this way, power-management unit 106 may enable power supplies 104(1)-(N) and/or 204(1)-(N) to operate in their most efficient range while remaining within an acceptable, legal operating temperature. Accordingly, power-management unit 106 may control power supplies 104(1)-(N) and/or 204(1)-(N) individually or as a whole to compensate for varying operating temperatures and/or power distribution needs.

In some examples, power-management unit 106 may power up and/or power down any of power supplies 104 (1)-(N) and/or 204(1)-(N) to compensate for varying operating temperatures and/or power distribution needs. For example, power-management unit 106 may decrease the amount of electrical power being output by power supply 104(1) to account for the operating temperature of power supply 104(1) exceeding the temperature threshold. In this example, to compensate for the decrease in the amount of electrical power being output by power supply 104(1), power-management unit 106 may power up one of power supplies 104(1)-(N) and/or 204(1)-(N) that was previously powered down.

As another example, network device 202 may no longer have the same power consumption needs. As a result, the temperature threshold may change. As a result, power-management unit 106 may decrease the amount of electrical power being output by one of power supplies 104(1)-(N) and/or 204(1)-(N) to maintain the operating temperature of that power supply in compliance with the temperature threshold. Additionally or alternatively, power-management unit 106 may even power down one of power supplies 104(1)-(N) and/or 204(1)-(N) that was previously powered up to ensure that power supplies 104(1)-(N) and/or 204(1)-(N) are operating in their most efficient range as a whole.

Figure 3:
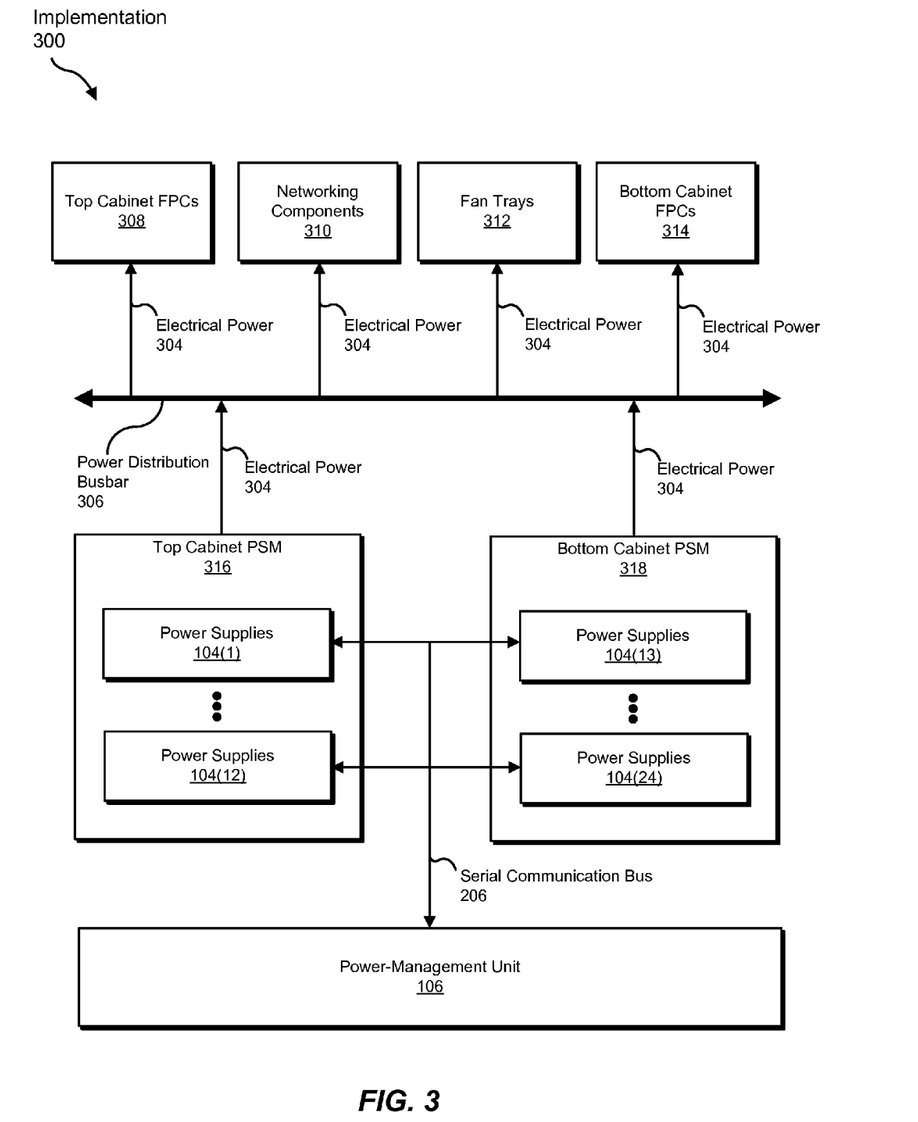
FIG. 3 is a block diagram of an exemplary implementation of an apparatus for temperature-based regulation of electrical power output.

FIG. 3 shows a block diagram of an exemplary implementation 300 of apparatus 100 for temperature-based regulation of electrical power output. As illustrated in FIG. 3, implementation 300 may include power-management unit 106 in communication with power supplies 104(1)-(12) and power supplies 104(13)-(24) within a network device. In this example, power supplies 104(1)-(12) may be united and/or grouped by a top cabinet PSM 316. Top cabinet PSM 316 may include 12 slots each designed to house and/or hold one of power supplies 104(1)-(12) in the top cabinet of the network device. Additionally or alternatively, power supplies 104(13)-(24) may be united and/or grouped by a bottom cabinet PSM 318. Bottom cabinet PSM 318 may include 12 slots each designed to house and/or hold one of power supplies 104(13)-(24) in the bottom cabinet of the network device.

As illustrated in FIG. 3, implementation 300 may also include a power distribution busbar 306 that is electrically coupled to top cabinet PSM 316 and bottom cabinet PSM 318. In this example, top cabinet PSM 316 and bottom cabinet PSM 318 may feed electrical power 304 output by power supplies 104(1)-(12) and 104(13)-(24) to various electrical components of the network device via power distribution busbar 306. These electrical components may include top cabinet FPCs 308, networking components 310, fan trays 312, and bottom cabinet FPCs 314. Top cabinet FPCs 308 and bottom cabinet FPCs 314 may include and/or represent the various FPCs mounted and/or installed in the top cabinet and bottom cabinet, respectively, of the network device. Networking components 310 may include and/or represent control boards, routing engines, and/or SIBs. Fan trays 312 may include and/or represent an FRU cooling mechanism that includes multiple fans that blow and/or deliver air to power supplies 104(1)-(12) and 104(13)-(24) in an effort to maintain and/or decrease their operating temperatures.

Figure 4:
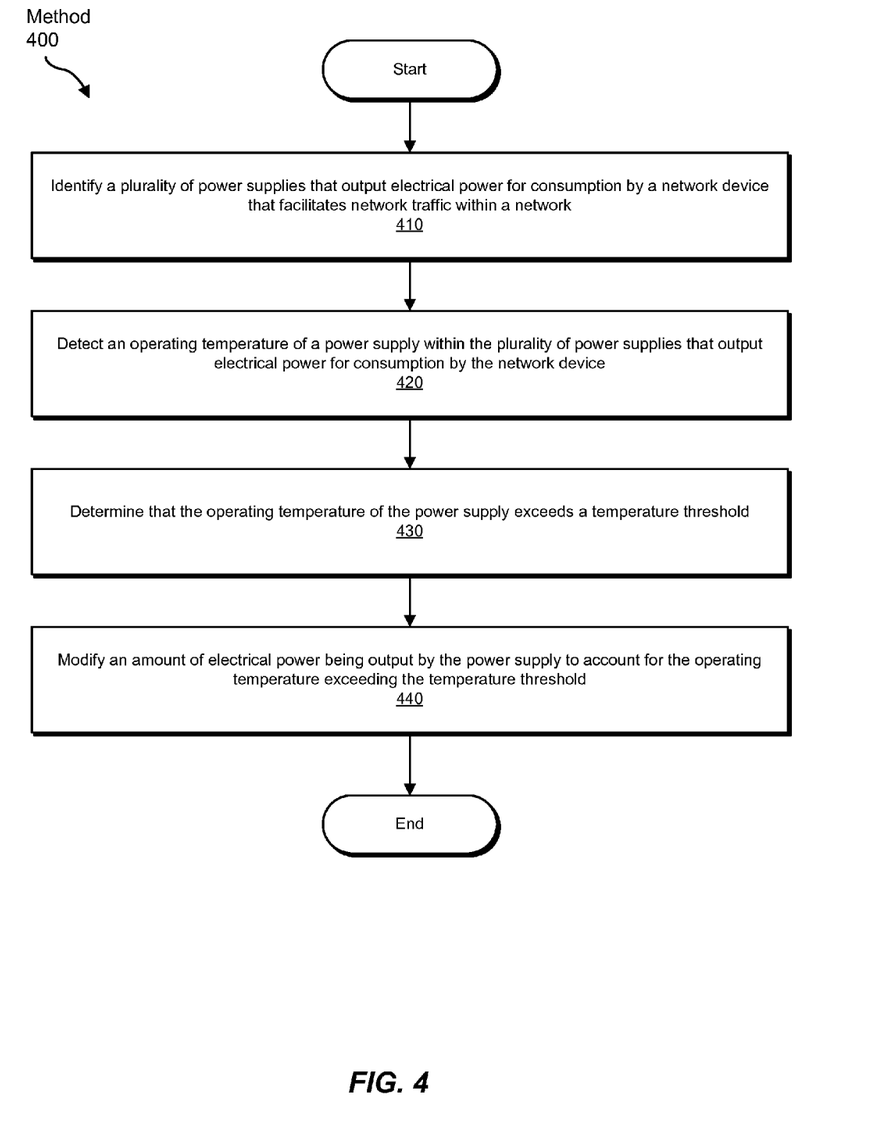
FIG. 4 is a flow diagram of an exemplary method for temperature-based regulation of electrical power output.

FIG. 4 is a flow diagram of an exemplary method 400 for temperature-based regulation of electrical power output. Method 400 may include the step of identifying a plurality of power supplies that output electrical power for consumption by a network device that facilitates network traffic within a network (410). This identifying step may be performed in a variety of ways, including any of those described above in connection with FIGS. 1-3. For example, power-management unit 106 may, as part of network device 202 included in a network, send out a query for any power supplies mounted and/or installed in network device 202 via serial communication bus 206. Additionally or alternatively, power-management unit 106 may identify each of power supplies 104(1)-(N) and/or 204(1)-(N) as a user and/or administrator of network device 202 mounts and/or installs power supplies 104(1)-(N) and/or 204(1)-(N) in network device 202.

Returning to FIG. 4, method 400 may also include the step of detecting an operating temperature of a power supply within the plurality of power supplies that output electrical power (420). This detecting step may be performed in a variety of ways, including any of those described above in connection with FIGS. 1-3. For example, power-management unit 106 may, as part of network device 202, query power supplies 104(1)-(N) and/or 204(1)-(N) for certain electrical characteristics (such as their operating temperature, input voltage and current, output voltage and current, and/or hours of operation) via serial communication bus 206. In response to the query, power supplies 104(1)-(N) and/or 204(1)-(N) may reply with one or more communications that identify the requested electrical characteristics via serial communication bus 206.

Returning to FIG. 4, method 400 may determine that the operating temperature of the power supply exceeds a temperature threshold (430). This determining step may be performed in a variety of ways, including any of those described above in connection with FIGS. 1-3. For example, power-management unit 106 may, as part of network device 202, compare the operating temperature of power supply 104(1) to a temperature threshold that marks and/or represents the maximum (or highest) acceptable operating temperature. Power-management unit 106 may then determine that the operating temperature of power supply 104(1) exceeds the temperature threshold based at least in part on this comparison.

Returning to FIG. 4, method 400 may further include the step of modifying an amount of electrical power being output by the power supply to account for the operating temperature exceeding the temperature threshold (440). This modifying step may be performed in a variety of ways, including any of those described above in connection with FIGS. 1-3. For example, power-management unit 106 may, as part of network device 202, direct power supply 104(1) to output a different amount of electrical power via serial communication bus 206. Additionally or alternatively, power-management unit 106 may decrease and/or increase the amount of electrical power being output by power supply 104(1) to compensate for varying operating temperatures and/or power distribution needs.

As explained above in connection with FIGS. 1-4, a network device (such as a router) may regulate the electrical power output by the power supplies installed in the network device based at least in part on the operating temperatures of the power supplies. In one example, a router may have two compartments (a top compartment and a bottom compartment) that each house and/or hold up to 12 power supplies for a total of up to 24 power supplies. The distance between these top and bottom compartments may reach up to 84 inches. The output voltages of these power supplies may be connected through a complex power distribution busbar whose load may vary greatly due at least in part to the location of the two compartments and/or operating temperatures. Unfortunately, in the event that more FPCs are installed in the top compartment than the bottom compartment, cooling fans running in the network device may be unable to effectively reduce the operating temperatures of the power supplies housed and/or held in the top compartment due to the heat dissipated by those FPCs.

To address the cooling fans inability to effectively reduce the operating temperatures in this way, the router may include a power-management unit that monitors the operating temperatures of the power supplies in the top and bottom compartments. For example, the power-management unit may periodically query the power supplies for their operating temperatures via $I^2C$ to determine whether the power supplies need any modifications to maintain an acceptable MTBF. In the event that one of the power supplies is operating at an unacceptably high temperature, the power-management unit may write, to a processor register of that power supply, a register value that will cause the power supply to decrease the amount of electrical power output to the power distribution busbar and thus bring down the operating temperature and/or MTBF of the power supply to an acceptable level. Accordingly, the power-management unit may be able to adjust the power supplies of the network device on an individual basis to compensate for varying operating temperatures and/or power distribution needs.

Figure 5:
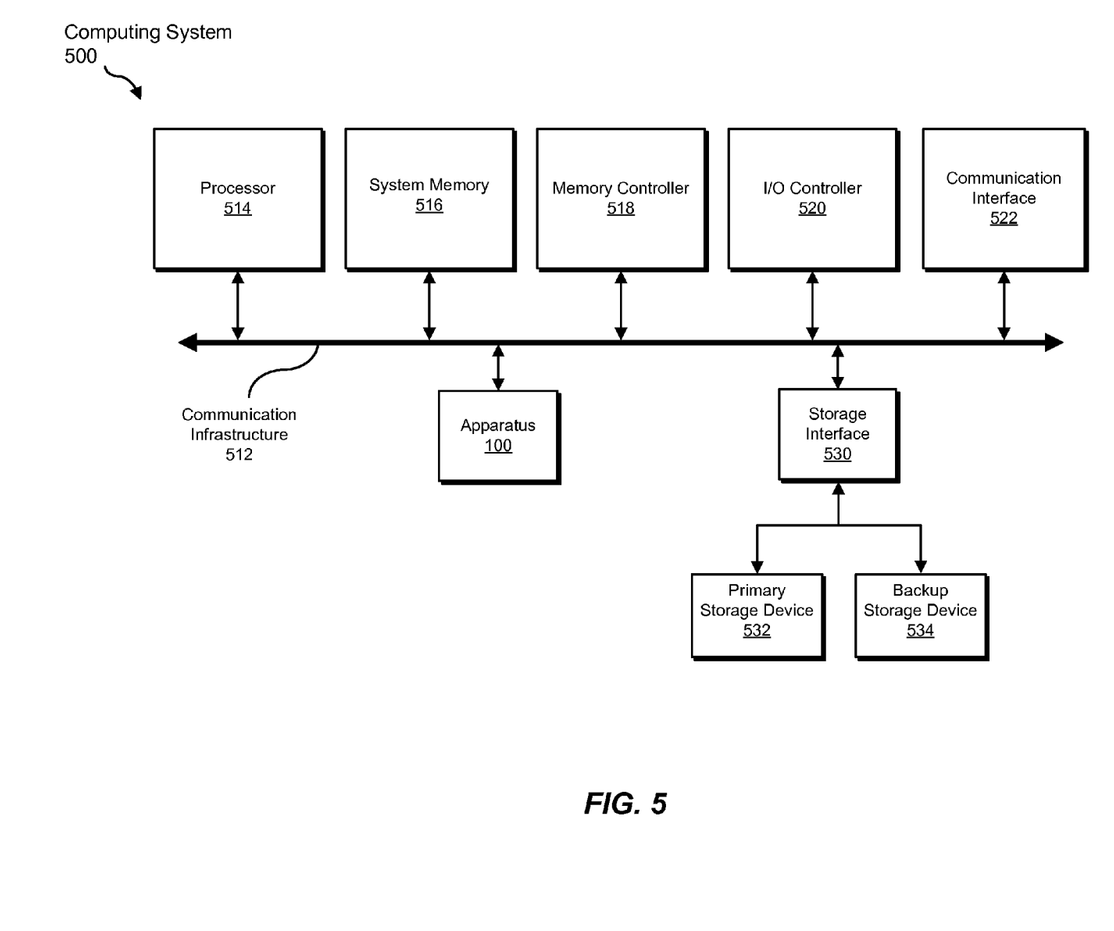
FIG. 5 is a block diagram of an exemplary computing system capable of implementing and/or being used in connection with one or more of the embodiments described and/or illustrated herein.

FIG. 5 is a block diagram of an exemplary computing system 500 capable of implementing and/or being used in connection with one or more of the embodiments described and/or illustrated herein. In some embodiments, all or a portion of computing system 500 may perform and/or be a means for performing, either alone or in combination with other elements, one or more of the steps described in connection with FIG. 6. All or a portion of computing system 500 may also perform and/or be a means for performing and/or implementing any other steps, methods, or processes described and/or illustrated herein. In one example, computing system 500 may include apparatus 100 from FIG. 1.

Computing system 500 broadly represents any type or form of electrical load, including a single or multi-processor computing device or system capable of executing computer-readable instructions. Examples of computing system 500 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 500 may be programmed, configured, and/or otherwise designed to comply with one or more networking protocols. According to certain embodiments, computing system 500 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 500 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 500 may include various network and/or computing components. For example, computing system 500 may include at least one processor 514 and a system memory 516. Processor 514 generally represents any type or form of processing unit capable of processing data or interpreting and executing instructions. For example, processor 514 may represent an application-specific integrated circuit (ASIC), a system on a chip (e.g., a network processor), a hardware accelerator, a general purpose processor, and/or any other suitable processing element.

Processor 514 may process data according to one or more of the networking protocols discussed above. For example, processor 514 may execute or implement a portion of a protocol stack, may process packets, may perform memory operations (e.g., queuing packets for later processing), may execute end-user applications, and/or may perform any other processing tasks.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 500 may include both a volatile memory unit (such as, for example, system memory 516) and a non-volatile storage device (such as, for example, primary storage device 532, as described in detail below). System memory 516 may be implemented as shared memory and/or distributed memory in a network device. Furthermore, system memory 516 may store packets and/or other information used in networking operations.

In certain embodiments, exemplary computing system 500 may also include one or more components or elements in addition to processor 514 and system memory 516. For example, as illustrated in FIG. 5, computing system 500 may include a memory controller 518, an Input/Output (I/O) controller 520, and a communication interface 522, each of which may be interconnected via communication infrastructure 512. Communication infrastructure 512 generally represents any type or form of infrastructure capable of facilitating communication between one or more components of a computing device. Examples of communication infrastructure 512 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 518 generally represents any type or form of device capable of handling memory or data or controlling communication between one or more components of computing system 500. For example, in certain embodiments memory controller 518 may control communication between processor 514, system memory 516, and I/O controller 520 via communication infrastructure 512. In some embodiments, memory controller 518 may include a Direct Memory Access (DMA) unit that may transfer data (e.g., packets) to or from a link adapter.

I/O controller 520 generally represents any type or form of device or module capable of coordinating and/or controlling the input and output functions of a computing device. For example, in certain embodiments I/O controller 520 may control or facilitate transfer of data between one or more elements of computing system 500, such as processor 514, system memory 516, communication interface 522, and storage interface 530.

Communication interface 522 broadly represents any type or form of communication device or adapter capable of facilitating communication between exemplary computing system 500 and one or more additional devices. For example, in certain embodiments communication interface 522 may facilitate communication between computing system 500 and a private or public network including additional computing systems. Examples of communication interface 522 include, without limitation, a link adapter, a wired network interface (such as a network interface card), a wireless network interface (such as a wireless network interface card), and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 522 may also represent a host adapter configured to facilitate communication between computing system 500 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also enable computing system 500 to engage in distributed or remote computing. For example, communication interface 522 may receive instructions from a remote device or send instructions to a remote device for execution.

As illustrated in FIG. 5, exemplary computing system 500 may also include a primary storage device 532 and/or a backup storage device 534 coupled to communication infrastructure 512 via a storage interface 530. Storage devices 532 and 534 generally represent any type or form of storage device or medium capable of storing data and/or other computer-readable instructions. For example, storage devices 532 and 534 may represent a magnetic disk drive (e.g., a so-called hard drive), a solid state drive, a floppy disk drive, a magnetic tape drive, an optical disk drive, a flash drive, or the like. Storage interface 530 generally represents any type or form of interface or device for transferring data between storage devices 532 and 534 and other components of computing system 500.

In certain embodiments, storage devices 532 and 534 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 534 may also include other similar structures or devices for allowing computer software, data, or other computer-readable instructions to be loaded into computing system 500. For example, storage devices 532 and 534 may be configured to read and write software, data, or other computer-readable information. Storage devices 532 and 534 may be a part of computing system 500 or may be separate devices accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from those shown in FIG. 5. Computing system 500 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. For example, one or more of the modules recited herein may receive data to be transformed into a value commensurate to a certain electrical power output, transform the data into the value, output a result of the transformation to a power supply, use the result of the transformation to modify the electrical power output of the power supply, and store the result of the transformation for future use and/or reference. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
   a first power supply module that:
      is stored in a top cabinet of a network device that facilitates network traffic within a network; and
      unites a first set of power supplies that are housed in the top cabinet of the network device and output electrical power for consumption by the network device;
   a second power supply module that:
      is stored in a bottom cabinet of the network device; and
      unites a second set of power supplies that are housed in the bottom cabinet of the network device and output electrical power for consumption by the network device;
   a power-management circuit communicatively coupled to the first and second sets of power supplies, wherein the power-management circuit:
      detects an operating temperature of at least one power supply within the first set of power supplies housed in the top cabinet of the network device;

determines that the operating temperature of the power supply within the first set of power supplies exceeds a temperature threshold; and modifies an amount of electrical power being output by the power supply within the first set of power supplies to account for the operating temperature exceeding the temperature threshold such that the power supply continues to output electrical power but the amount of electrical power being output by the power supply is decreased; and wherein an ambient air temperature within the top cabinet is greater than another ambient air temperature within the bottom cabinet.

2. The apparatus of claim 1, wherein the power-management circuit:

detects the operating temperature of the power supply by querying the power supply for the operating temperature via a serial communication bus; and modifies the amount of electrical power being output by the power supply by directing the power supply to output a different amount of electrical power via the serial communication bus.

3. The apparatus of claim 2, wherein the power-management circuit directs the power supply to output the different amount of electrical power by writing, to a processor register of the power supply, a register value commensurate to the different amount of electrical power.

4. The apparatus of claim 2, wherein the serial communication bus comprises at least one of:

an Inter-Integrated Circuit ($I^2C$) bus;
a Two-Wire Interface (TWI) bus; and
a Serial Peripheral Interface (SPI) bus.

5. The apparatus of claim 1, wherein the power-management circuit determines that the operating temperature of the power supply exceeds the temperature threshold by:

detecting at least one operating temperature of at least one additional power supply within the first set of power supplies; and determining the temperature threshold based at least in part on the operating temperature of the additional power supply.

6. The apparatus of claim 1, wherein the power-management circuit:

determines that the operating temperature of the power supply exceeds the temperature threshold by determining the temperature threshold based at least in part on a Mean Time Between Failures (MTBF) metric that corresponds to the operating temperature of the power supply; and modifies the amount of electrical power being output by the power supply by directing the power supply to output a different amount of electrical power that improves the MTBF metric due at least in part to a reduction in the operating temperature of the power supply.

7. The apparatus of claim 1, wherein the power-management circuit:

detects an operating temperature of another power supply within the second set of power supplies that output electrical power for consumption by the network device;

determines that the operating temperature of the other power supply exceeds the temperature threshold; and modifies an amount of electrical power being output by the other power supply to account for the operating temperature of the other power supply exceeding the temperature threshold.

8. The apparatus of claim 1, wherein at least one of:

the first and second power supply modules are each modularly removable from the network device;

the first set of power supplies are each modularly removable from the first power supply module; and the second set of power supplies are each modularly removable from the second power supply module.

9. The apparatus of claim 1, wherein the power-management circuit further ensures that all operating temperatures of the first and second sets of power supplies are maintained within a certain number of degrees of one another.

10. A network device comprising:

a first set of power supplies that output electrical power for consumption in facilitating network traffic within a network;

a first power supply module that electrically unites the first set of power supplies;

a top cabinet that houses first power supply module and the first set of power supplies united by the first power supply module;

a second set of power supplies that output electrical power for consumption in facilitating network traffic within the network;

a second power supply module that electrically unites the first set of power supplies;

a bottom cabinet that houses first power supply module and the first set of power supplies united by the first power supply module;

a power-management circuit communicatively coupled to the first and second sets of power supplies, wherein the power-management circuit:

detects an operating temperature of at least one power supply within the first set of power supplies housed in the top cabinet of the network device;

determines that the operating temperature of the power supply within the first set of power supplies exceeds a temperature threshold; and modifies an amount of electrical power being output by the power supply within the first set of power supplies to account for the operating temperature exceeding the temperature threshold such that the power supply continues to output electrical power but the amount of electrical power being output by the power supply is decreased; and wherein an ambient air temperature within the top cabinet is greater than another ambient air temperature within the bottom cabinet.

11. The network device of claim 10, wherein the power-management circuit:

detects the operating temperature of the power supply by querying the power supply for the operating temperature via a serial communication bus; and modifies the amount of electrical power being output by the power supply by directing the power supply to output a different amount of electrical power via the serial communication bus.

12. The network device of claim 11, wherein the power-management circuit directs the power supply to output the different amount of electrical power by writing, to a processor register of the power supply, a register value commensurate to the different amount of electrical power.

13. The network device of claim 11, wherein the serial communication bus comprises at least one of:

an $I^2C$ bus;
a TWI bus; and
an SPI bus.

14. The network device of claim 10, wherein the power-management circuit determines that the operating temperature of the power supply exceeds the temperature threshold by:
- detecting at least one operating temperature of at least one additional power supply within the first set of power supplies; and
- determining the temperature threshold based at least in part on the operating temperature of the additional power supply.

15. The network device of claim 10, wherein the power-management circuit:
- determines that the operating temperature of the power supply exceeds the temperature threshold by determining the temperature threshold based at least in part on a Mean Time Between Failures (MTBF) metric that corresponds to the operating temperature of the power supply; and
- modifies the amount of electrical power being output by the power supply by directing the power supply to output a different amount of electrical power that improves the MTBF metric due at least in part to a reduction in the operating temperature of the power supply.

16. The network device of claim 10, wherein the power-management circuit further ensures that all operating temperatures of the first and second sets of power supplies are maintained within a certain number of degrees of one another.

17. A method comprising:
- identifying a first set of power supplies that:
  - are housed in a top cabinet of a network device that facilitates network traffic within a network;
  - are united by a first power supply module; and
  - output electrical power for consumption by the network device;
- identifying a second set of power supplies that:
  - are housed in a bottom cabinet of the network device;
  - are united by a second power supply module; and
  - output electrical power for consumption by the network device;
- detecting an operating temperature of at least one power supply within the first set of power supplies housed in the top cabinet of the network device;
- determining that the operating temperature of the power supply within the first set of power supplies exceeds a temperature threshold;
- modifying an amount of electrical power being output by the power supply within the first set of power supplies to account for the operating temperature exceeding the temperature threshold such that the power supply continues to output electrical power but the amount of electrical power being output by the power supply is decreased; and
- wherein an ambient air temperature within the top cabinet is greater than another ambient air temperature within the bottom cabinet.

\* \* \* \* \*